United States Patent [19]
Dinkler

[11] 3,930,192
[45] Dec. 30, 1975

[54] STAND-BY POWER SYSTEM
[75] Inventor: Leonard R. Dinkler, Gainesville, Fla.
[73] Assignee: General Electric Company, Columbus, Ohio
[22] Filed: May 20, 1974
[21] Appl. No.: 471,593

[52] U.S. Cl. ............... 320/15; 320/17; 320/21; 307/66
[51] Int. Cl.² ........................... H02J 7/00
[58] Field of Search ............... 320/6–8, 15–18, 320/2, 14, 21, 19; 307/66

[56] References Cited
UNITED STATES PATENTS

| | | | |
|---|---|---|---|
| 979,155 | 12/1910 | Gugler | 320/8 X |
| 1,468,096 | 9/1923 | Young | 320/18 X |
| 3,114,095 | 12/1963 | Palmer | 307/66 X |
| 3,796,940 | 3/1974 | Mauch et al. | 320/44 X |

FOREIGN PATENTS OR APPLICATIONS

| | | | |
|---|---|---|---|
| 834,022 | 5/1960 | United Kingdom | 320/17 |

Primary Examiner—Harold Broome
Assistant Examiner—Robert J. Hickey
Attorney, Agent, or Firm—Dennis A. Dearing; Donald J. Voss; Frank L. Neuhauser

[57] ABSTRACT

A charging system for a stand-by power supply comprising a battery having plurality of series-connected cells and a switching means for periodically and sequentially charging sections of the battery, thereby to minimize voltage variation between the normal DC power source voltage and the stand-by power supply discharge voltage applied to a load during the non-functioning of the DC power source.

12 Claims, 6 Drawing Figures

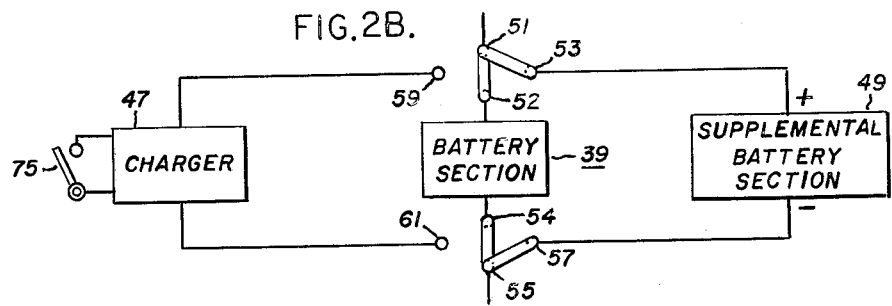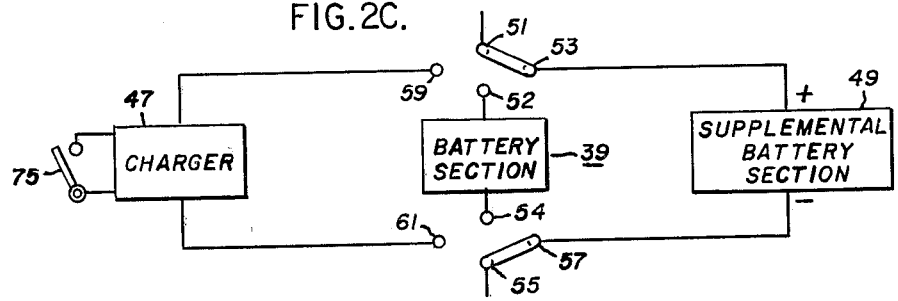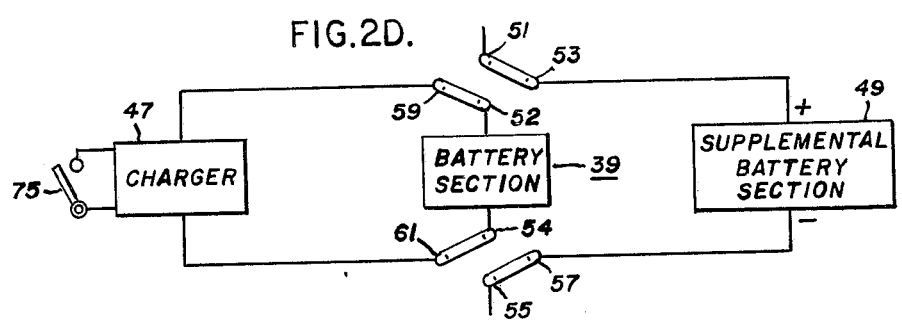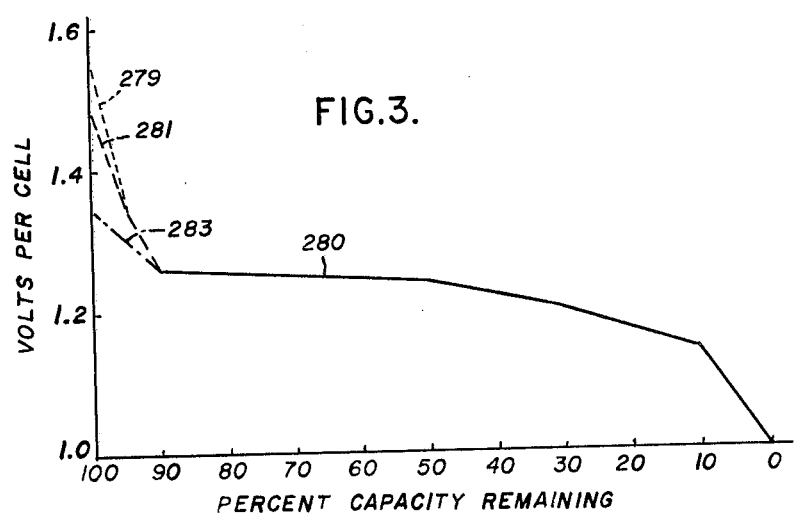

STAND-BY POWER SYSTEM

CROSS REFERENCE TO RELATED APPLICATION

This application is related to U.S. Pat. application Ser. No. 471,594 of Ferdinand H. Mullersman, filed concurrently herewith and assigned to the assignee of the invention herein.

BACKGROUND OF THE INVENTION

This invention is directed to the art including battery chargers and, more particularly, a charging system for maintaining the level of charge of a stand-by battery power system such that the voltage variation upon and after transition between a DC bus and the stand-by power supply can be minimized.

Stand-by power systems comprised of batteries of rechargeable cells have a recurring problem in that the cells tend to self-discharge over periods of nonuse. This requires a stand-by battery power system to be recharged continuously or periodically to maintain the capacity at a predetermined level necessary for it to deliver the required power during the absence of the normal source of power. Particularly, when using a multicell, high-voltage stand-by battery power system, it has been necessary to utilize a large, expensive charger having dangerously high power delivery capability to offset the continual self-discharge of the system.

Another problem associated with high voltage stand-by battery power systems that arises, because the systems are typically "floated" across a constant potential bus (i.e., continuously connected to a DC bus having a line voltage greater than the open-circuit voltage of the system), is that special design considerations have been required to tolerate this charge/discharge regime. One such design consideration is the necessary inclusion of large electrolyte reserves.

A related problem to this results from the difference in magnitude between the bus voltage and the discharge voltage of a stand-by battery power supply which occurs in conventional systems. These voltage variations, which would be applied to a load upon and after transition between the bus voltage and the discharge voltage of stand-by power supply, are unacceptable for many applications. To compensate for this, it has usually been necessary to provide complex and expensive voltage-regulating equipment to permit the normal operation of the load upon transition to the stand-by power supply.

SUMMARY OF THE INVENTION

It is accordingly an object of this invention to provide an improved high-voltage, stand-by battery power system, thereby to avoid many of the problems associated with prior art systems.

Another object of this invention is to provide a high voltage stand-by battery power system with a charging apparatus permitting the use of a smaller, less expensive charger than that heretofore utilized.

Another object of the invention is to minimize the voltage variations between the bus voltage and the stand-by battery discharge voltage in a stand-by power system.

These and other objects of the invention will be better understood from the following description taken in connection with the accompanying drawings.

BRIEF DESCRIPTION OF THE DRAWINGS

FIGS. 2B, 2C, 2D are schematic diagrams of the switching sequence of one portion of the diagram shown in FIG. 2A.

FIG. 3 is a graph of the characteristic curves of the discharge voltage per cell versus the percent capacity remaining per cell of batteries charged by conventional methods and of batteries charged in accordance with this invention.

DESCRIPTION OF THE PREFERRED EMBODIMENTS

Figure 1:
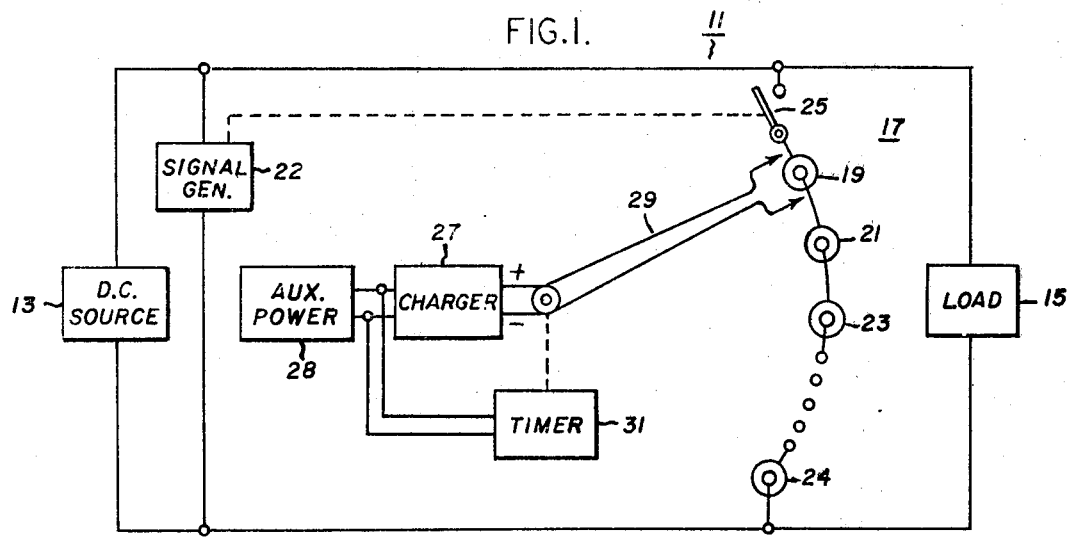
FIG. 1 is a block diagram of one embodiment of a stand-by power system in accordance with this invention.

In FIG. 1, a stand-by power system 11 is shown constructed in accordance with the features of this invention. The system 11 comprises a load 15 which is normally energized by a source of DC power 13. Load 15 requires a predetermined voltage level for operation. A stand-by multi-cell battery 17 is provided to supply power to the load 15 in the absence of a voltage from the source 13 sufficient to operate the load 15 satisfactorily.

The battery 17, which is comprised of a predetermined number of series-connected sections 19, 21, 23, and 24, each section having at least one cell, is connectible electrically across the load 15 via a switch 25 responsive to a signal from a signal generator 27. The signal generator 27 is responsive to the dropping of the voltage from source 13 below the predetermined level necessary for the satisfactory operation of the load 15.

The battery 17 is preferably comprised of rechargeable nickel-cadmium cells (Ni-Cd) of a conventional construction, such as General Electric Company's rechargeable vented 13Ah Ni-Cd cells, Cat. No. 43B011AC02. The specific constructions of the cells do not form a part of the invention herein.

As is well known in the art, a conventional secondary battery such as those consisting of Ni-Cd cells continually self-discharge from a charged condition when standing open circuit. Thus, to maintain the battery 17 at the predetermined capacity level required for the operation of load 13, a charger 22 is provided for sequentially and periodically charging each battery section 19, 21, 23, 24 by the operation of a movable switch arm 29 operated by a timing motor 31 of any conventional construction. At any point in time the sections which are not being charged will decay in voltage from their charging voltage derived from their last connection to the charger 27 as explained more fully hereinbelow.

The battery 17 in the preferred Ni-Cd embodiments can be made of approximately 200 cells, which could be divided into battery charging sections of approximately 20 cells each. Thus, the battery sections would be approximately 24 volts each. It is desirable, in accordance with the preferred embodiments, for convenience in handling, safety, and to enable charging with a low voltage power source, that the battery sections be less than 30 volts.

The charger 27 for the individual battery sections may be of a conventional construction such as Part No. 3S2060DM 169A1 marketed by the General Electric Company. The preferred conventional charging system utilizes a constant current source at approximately the one-hour rate (C-rate). The battery sections as charged by this system will be charged to a voltage, which is automatically adjusted for temperature, such as 1.48 volts per cell at 25°C. Upon attaining this voltage, the C-rate charge current is interrupted and the battery section voltage is allowed to decay through a bleeder load resistor (not shown). A bleeder load resistor, for example, can be continuously connected across each battery section. When the battery voltage has decayed to approximately 1.35 volts per cell at 25°C, the C-rate current is again initiated and the battery section voltage is again driven to the current cut-off as established by the temperature-compensated voltage of the cells being charged. This charging mode results in having an overcharge mode of a pulsed C-rate current. The high rate charge current is preferred for Ni-Cd batteries because the positive plate has poor charge acceptance at low charge current levels but has significantly improved charge acceptance at the C-rate level of current. Thus, the pulsed C-rate overcharge permits the positive plate to be charged at a near optimum charge rate during restoration of the capacity previously discharged and also enables the minimization of electrolyte loss, which loss is directly proportionate to the integral of the overcharge current diminished by the self discharge current.

The signal generator 22 is connected across the DC power supply 13 and is additionally operatively connected to the switch 25 for providing for either the manual or automatic connection of the stand-by battery 17 across the load 15. The signal generator 22 may be selected from any number of conventional mechanisms such as a light or a bell which would provide a signal to a manual operator that the voltage from the DC power supply 13 has dropped below a predetermined level. Alternatively, the signal generator 22 could be chosen from any number of conventional electronic or electromechanical systems as will be apparent to those skilled in the art. Similarly, the signal generator 22 provides for either the manual or automatic termination of power to the charger 27, which power is supplied from an auxiliary power supply 28 connected thereto. This provides for the termination of the charging of battery 17 during nonfunctioning of the normal power supply 13, the battery being connected to the load 15 at that time.

Figure 2A:
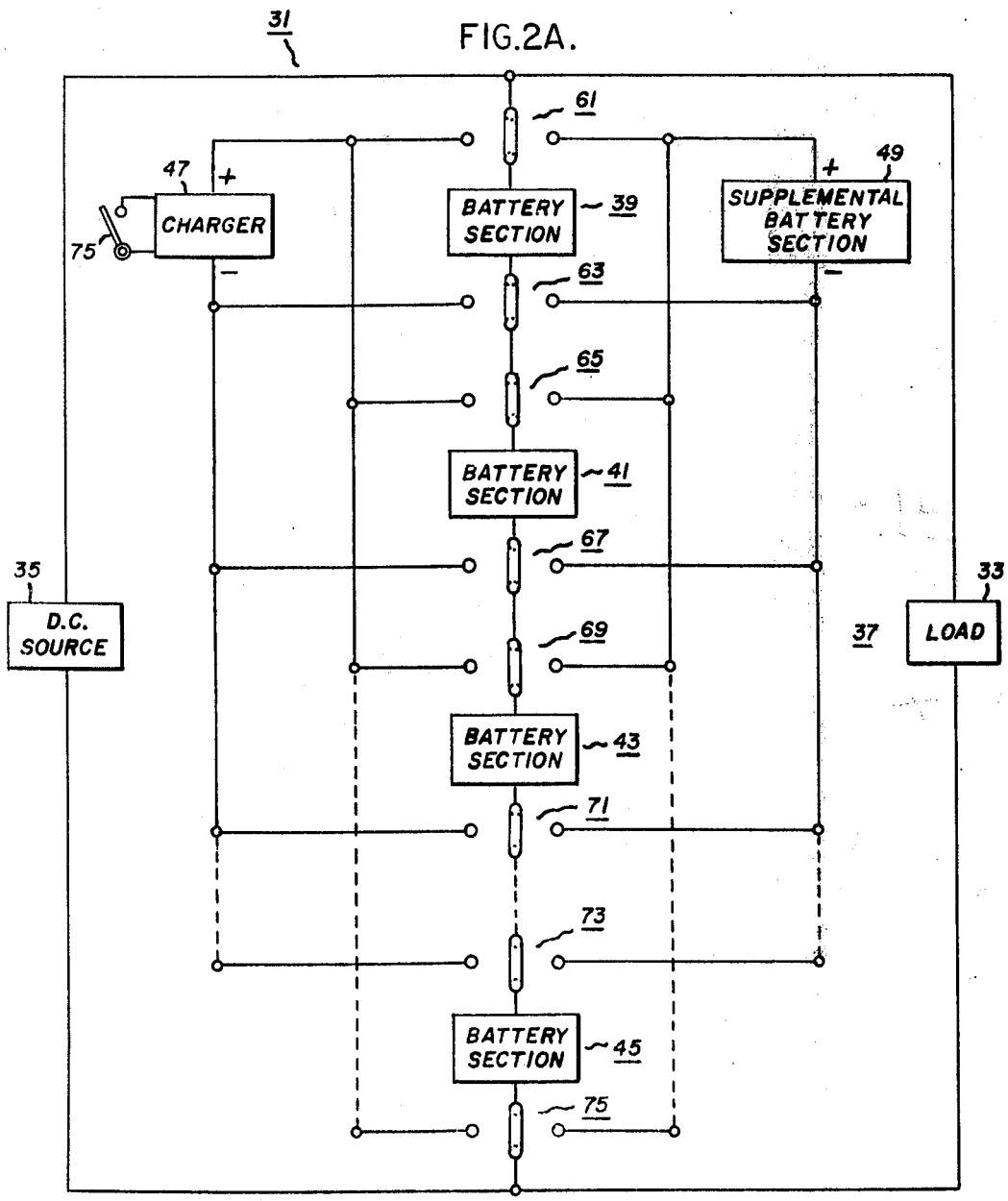
FIG. 2A is a schematic diagram of another embodiment of a stand-by battery power system in accordance with this invention.

In FIG. 2A and in accordance with the preferred embodiment of this invention, there is shown a stand-by battery power system 31 for providing continuous energization of load 33, which load requires a predetermined voltage level for normal operation. The load 33 is normally energized by a conventional DC source 35. A battery 37 is floated across the DC bus and will "pick up" or supply energy to the load 15 in the absence of an adequate voltage level for normal load operation being supplied from DC source 35. "Floating" in this context means to provide continuous electrical connection of the battery 37 to a bus voltage, in this case voltage from DC source 35. The source 35 should have only a slightly greater voltage than that of the open circuit voltage of the battery 37 so that under normal operating conditions the DC source will have substantially no charging effect on the battery 37.

As will be apparent to those skilled in the art, the battery 17 can alternately be connectible, in the absence of the normal source of power from DC source 35, across the load 33 through a switching mechanism responsive to a signal generator. Various designs for the switch mechanism and signal generator will be apparent to those skilled in the art such as the design of switch 25 and signal generator 22 discussed in regard to the embodiment shown in FIG. 1.

The battery 37 is comprised of a predetermined number of series-connected sections, here shown with four sections 39, 41, 43, and 45, each section having at least one cell. As discussed in accordance with the embodiment shown in FIG. 1, the battery sections 39, 41, 43, and 45 are preferably comprised of conventional, vented, rechargeable nickel-cadmium cells and are periodically and sequentially charged via a conventional, pulsed charger 47, to maintain the stand-by battery 37 at said predetermined voltage level. The charger 47 is electrically connectible across each battery section in sequence to each battery section 39, 41, 43, 45 via respective pairs of switch junctions 61, 63; 65, 67, 69, 71; 73, 75. Additionally in the preferred embodiment, a supplemental battery section 49 is electrically connectible to each battery section 39, 41, 43, 45 via the same respective pairs of switch junctions 61, 63; 65, 67, 69, 71; 73, 75. The supplementary section 49 is utilized to sequentially replace each battery section in the stand-by power supply battery 37 when each stand-by section is, in turn, connected to the charger 47.

It will, of course, be understood by those skilled in the art that the sequential charging of the battery sections will be terminated when the stand-by battery is required to energize the load. This is done automatically in the case of a general power outage because the power supply for the charger, which is of any conventional design (not shown) meeting the requirements of the charger, will then be inoperative also. Alternatively, in the case of a localized inadequacy of power from DC source 35, the operation of the charger can either be manually or automatically terminated by any conventional means.

The switch junctions of FIG. 2A are intended to be merely illustrative of the switching functions required to sequentially and periodically charge each battery section. As will be apparent to those skilled in the art, such switch functions as explained hereinbelow can be carried out manually if desired. But, it will be further apparent that automatic switching systems can alternatively be designed to carry out these switching functions if desired.

In FIGS. 2B, 2C, and 2D, a switching sequence is shown for substituting supplemental battery section 49 for battery section 39 as it is removed from the plurality of series-connected battery sections for connection to the charger 47 for recharging. The remainder of the system 31 shown in FIG. 2A is omitted for simplicity in view of the fact that it remains unchanged during the switching sequence described hereinbelow. In FIG. 2B, the initial condition shown in FIG. 2A (i.e., positive terminal of battery section 39 is connected to the DC bus 35 via terminals 49 and 51, and the negative terminal of battery section 39 is connected to the positive terminal of battery section 41 via contacts 53 and 55) is changed to addtionally connect supplemental battery section 49 in parallel with battery section 39 via connection between the terminal 49 and a terminal 53 connected to the positive terminal of section 49 and connection between terminal 55 and a terminal 57 connected to the negative terminal of section 49.

FIG. 2C shows the second step of the switching sequence wherein the connection between terminals 49 and 51 at the positive terminal of battery section 39 and the connection between terminals 54 and 55 at the negative terminal of battery section 39 are opened, thereby to leave the supplemental battery section 49 in series with the remaining battery sections 41, 43, and 45 floating across the DC source 35.

FIG. 2D shows the third step of the switching sequence wherein connection is made between terminal 51 and a terminal 59 connected to the positive output terminal of the charger 47 and also between terminal 54 and a terminal 61 connected to the negative output terminal of the charger 47, thereby to connect the battery section 39 in series with the charger 47. After this, the charger 47 is energized via a control switch 75 for the pulsed charging of battery section 39 in accordance with the operation set forth hereinbefore for charger 13 (FIG. 1).

After charging and after the charger 47 is deenergized via control switch 75, the battery section 39 is returned to series connection with the other battery section 41, 43, 45 by a reversal of the steps shown in FIGS. 2B, 2C, 2D; that is, first the connections between terminals 51 and 59, and terminals 54 and 61 (FIG. 2D) are broken to disconnect the battery section 39 from the charger 47, which condition is shown in FIG. 2C. Then connection is again made between terminals 49 and 51, and terminals 54 and 55 to reconnect battery section 39 in parallel with supplemental battery section 49 as shown in FIG. 2B. The connections between terminals 49 and 53, and terminals 55 and 57 are then opened, which returns the system 31 to the condition shown in FIG. 2A. The next battery section 41 is then connected to the charger 47 via switch junctions 65, 67 in an analogous manner to the switching sequence shown in FIGS. 2B, 2C, and 2D. The switching sequence is then continued with the subsequent charging of sections 73 and 75. After this, the switching sequence is started over again with battery section 39, thereby to provide a sequential, periodic charging of each battery section during the normal operation of DC source 35.

One of the advantages of this embodiment is that the battery may be left across DC source so that upon disablement of the DC source, the stand-by power system picks up the load 33 without interruption. This is important and necessary when a load, such as a computer memory, cannot tolerate interruptions in power as might occur in the embodiment of FIG. 1 due to the finite switching time required to electrically connect the stand-by batteries 17 to the load 15 via switch 25 in the absence of a normal supply of power from DC power supply 13.

Another feature of this embodiment is that the supplemental battery section 49 is substituted for each section of the stand-by battery 37 when it has been removed from the stand-by battery for charging. This provides an essentially constant voltage for the stand-by battery floating across the DC source. If a battery section, such as section 39, were left in series with the remaining sections of the stand-by battery while charging, the charging voltage applied to the section 39 would raise the total battery voltage floated across the bus voltage; and to the extent that the total battery voltage exceeded the bus voltage, the battery 37 would discharge into the load. This would result in the loss of charge current from the charging section 39 and would cause a discharge current through the remaining battery sections.

One of the primary features of this invention is to provide, as nearly as possible, a stand-by battery voltage approximately equal to the bus voltage and to minimize the voltage variation applied to the load upon and after transition to the stand-by battery. It will be clear that, in the embodiment of FIG. 2 wherein the battery is floated across the bus, the bus voltage must be in reality a litter greater than the stand-by battery voltage, but the object is to make them as nearly equal as possible in the embodiments of both FIGS. 1 and 2. The charging scheme of this invention provides for all of the battery sections except the one which is applied at any instant to the charger to be decaying in voltage to its open-circuit, steady-state voltage from the charger voltage; and optionally, with a pulsed charger 19 as explained hereinbefore, even the section being charged could be caused to decay in voltage somewhat, through the bleeder load resistor (load resistance means) (not shown), before being reconnected into the supply.

Referring now to FIG. 3, this feature can be better understood by considering a graph of the discharge voltage per cell as a function of the percent capacity remaining per cell for vented Ni-Cd cells charged by various charging schemes. A dotted line 279 represents the discharge curve of a plurality of cells after a C/10 constant current overcharge which gives them an end of charge voltage 1.55 volts per cell. As can be seen, the discharge curve will drop to a voltage plateau region 280 starting at approximately 1.25 volts per cell and about 90% capacity and ending at 1.15 volts and 10% capacity. This central portion of the curve is the region having the smallest voltage variation per unit discharge time. Accordingly, this region is the most desirable operating region for stand-by Ni-Cd battery power supplies. A dotted line 281 represents a multi-cell battery charged by a constant potential float charge at a voltage of approximately 1.50 volts per cell. Its discharge curve is substantially analogous to that of the C/10 constant current overcharged battery in that it falls from an initial charging voltage of approximately 1.50 volts into the plateau region of the curve at approximately 1.25 volts per cell and 90% capacity. In contrast, a dot-dash line 283 represents the discharge curve of a battery charged in accordance with the invention herein wherein all battery section are in various stages of exponential decay — with the possible exception that the battery section on charge at any particular time may not be decaying in voltage because it is receiving charge current — between the end of charge voltage of 1.48 volts per cell and a voltage of approximately 1.35 volts per cell. This yields an initial average composite stand-by battery voltage per cell available to the load of between 1.36 volts and 1.38 volts as, for example, in a 200-cell battery of 10 battery sections of 20 cells each using a total sequencing cycle, e.g., of 1 hour. The stand-by battery voltage is heavily weighted toward the 1.35 volt value bacause (1) the most rapid voltage decay occurs at values above 1.35 volts, and (2) the battery sections not on charge will not decay substantially lower than 1.35 volts per cell during the periods when they are not applied to the charger for recharging.

Thus, the stand-by battery voltage which would be applied to the load in any instant will be based primarily on a voltage per cell approximately equal to the lower steady-state, open-circuit voltage of the cells rather than the higher, per cell, charger voltage which would result from the simultaneous charging of all battery sections.

It can be seen that the periodic sequential charge of a standby battery in sections as disclosed by this invention would yield a significantly reduced voltage variation when connected to the load by allowing the majority of the sections to be decaying while one section is on charge. This diminishes many of the problems experienced in the prior art such as the provision of expensive and complex regulating equipment to protect the load from the voltage variations which they would be exposed to when using conventional stand-by power systems. As can be seen, the voltage variation inherent in Ni-Cd systems charged by conventional methods is approximately 0.50 to 0.55 volts per cell over the effective capacity of a stand-by battery supply whereas a battery charged in accordance with the invention herein has an inherent voltage variation of approximately 0.36 volts per cell over the effective capacity of a stand-by supply. More significant, though, is the fact that Ni-Cd systems charged by conventional methods would experience an initial drop of 0.25 to 0.30 volts per cell between full charge and 90% capacity in contrast with the supply of this invention which would experience an initial drop of approximately 0.11 volts over approximately the same discharge time to reach the 1.25 volt plateau region of FIG. 3.

This invention has only been shown and described with respect to three and four battery sections. However, as will be apparent to those skilled in the art, the sequencing arrangement can obviously be constructed for any number of battery sections. As has been stated, a typical example would be the use of 10 battery sections. Thus, the charger would be applied for 6-minute intervals, excluding switching time, to each respective battery section, thereby enabling a sequencing scheme to be completed in one hour.

Furthermore, the invention, as will be understood by those skilled in the art, can readily be utilized with battery types other than Ni-Cd such as, e.g., a lead-acid battery.

Thus, while the invention has been shown and described with respect to specific embodiments thereof, it is not intended to be limited to the particular forms shown and described. Accordingly, the appended claims are intended to cover all modifications within the spirit and scope of the invention herein described.

What I claim as new and desire to secure by letters Patent of the United States:

1. A battery charging apparatus for a high voltage stand-by power system, said system comprising a power source connected in circuit with a load, a supplemental battery section, and a battery of rechargeable cells coupled across said load to provide stand-by power upon the non-functioning of said source, said battery being divisible into a plurality of sections of at least one cell each for charging, said apparatus comprising:
   a. charging means for supplying a source of charging current;
   b. switching means, coupled between said charging means and said battery, for sequentially disconnecting one section at a time, each of said plurality of sections from said battery and for connecting said disconnected section to said charger for charging; and
   c. a supplemental switching means, coupled between said supplemental section and said battery, for connecting said supplemental section in parallel with each of said plurality of sections, one section at a time.

2. The apparatus of claim 1 further comprising load resistance means for causing each of said plurality of sections to slowly decay in voltage after charging.

3. The apparatus of claim 1 wherein said charging means comprises means for supplying pulsed charge current.

4. The apparatus of claim 1 further comprising signal generating means coupled to said source for generating a signal when the voltage level of said source falls below a predetermined level.

5. A stand-by power system for a load normally powered by a power source connected in circuit with said load comprising:
   a. a battery comprising a plurality of cells coupled across said stand-by load to provide stand-by power upon the non-functioning of said source, said battery being divisible into a plurality of sections of at least one cell each for charging;
   b. charging means for supplying charge current;
   c. switching means, coupled between said charging means and said battery, for sequentially disconnecting, one section at a time, each of said plurality of sections from said battery and for connecting said disconnected section, to said charging means for charging;
   d. a supplemental battery section; and
   e. a supplemental switching means, coupling said battery and supplemental section, for electrically connecting said supplemental section in parallel with each of said plurality of sections, one section at a time.

6. The system of claim 5 wherein said charging means comprises means for supplying pulsed charge current.

7. The system of claim 5 wherein said battery is floating across said source.

8. The system of claim 5 further comprising signal generating means, coupled to said source, for generating a signal when the voltage level of said source falls below a predetermined level.

9. The system of claim 7 further comprising load resistance means for causing each of said plurality of sections to discharge after charging.

10. A method for charging a stand-by power system designed to supply electrical power to a load during the non-functioning of the normal power source for said load, said system comprising a plurality of rechargeable cells connected in circuit, said cells being divisible, for charging, into a plurality of sections of at least one cell each and a supplemental section of at least one cell, said method comprising the steps, in sequence, of:
   a. connecting said supplemental section in parallel with one of said plurality of sections;
   b. disconnecting said one section from the remaining sections, thereby to leave said supplemental section in series with said remaining sections;
   c. connecting said one section to a source of charging current;
   d. disconnecting said one section from said charger after charging;
   e. reconnecting said one section in parallel with said supplemental section; and
   f. repeating steps (a) through (e) for a second one of said plurality of sections.

11. The method of claim 10 further comprising the step of:

d. providing a supplemental section of at least one cell;

e. connecting said supplemental section in parallel with said one section prior to connecting said one section to said charging source of charging current;

f. disconnecting said one section from said remaining sections prior to connecting said one section to said source of charging current and after said connection of said supplemental section in parallel with said one section, thereby to leave said supplemental section in series with said remaining sections;

g. disconnect said one section from said charging source after charging;

h. reconnect said one section in parallel with said supplemental section after disconnection from said charging source; and i. repeat steps (e) through (h) for said second section.

12. The method of claim 10 further comprising the steps of causing said one section to decay in voltage after charging and prior to reconnection to said battery.

* * * * *